United States Patent
Ponnuru et al.

(10) Patent No.: US 11,146,403 B2
(45) Date of Patent: Oct. 12, 2021

(54) SELF-GOVERNED SECURE ATTESTATION POLICY FOR SERVER DATA PRIVACY LOGS

(71) Applicant: Dell Products L.P., Round Rock, TX (US)

(72) Inventors: Viswanath Ponnuru, Bangalore (IN); Prasoon Kumar Sinha, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 263 days.

(21) Appl. No.: 16/247,735

(22) Filed: Jan. 15, 2019

(65) Prior Publication Data

US 2020/0228345 A1 Jul. 16, 2020

(51) Int. Cl.
| | |
|---|---|
| H04L 29/06 | (2006.01) |
| H04L 9/32 | (2006.01) |
| G06F 21/62 | (2013.01) |
| H04L 9/06 | (2006.01) |
| G06F 21/60 | (2013.01) |

(52) U.S. Cl.
CPC .......... *H04L 9/3247* (2013.01); *G06F 21/604* (2013.01); *G06F 21/6218* (2013.01); *H04L 9/0637* (2013.01); *H04L 63/10* (2013.01); *H04L 63/12* (2013.01); *H04L 2209/04* (2013.01); *H04L 2209/38* (2013.01)

(58) Field of Classification Search
CPC ..... H04L 9/3247; H04L 9/0637; H04L 63/10; H04L 63/12; H04L 2209/04; H04L 2209/38; G06F 21/604; G06F 21/6218
See application file for complete search history.

(56) References Cited

U.S. PATENT DOCUMENTS

| | | | | |
|---|---|---|---|---|
| 7,610,391 | B2* | 10/2009 | Dunn | G06F 21/6218 709/229 |
| 10,824,759 | B1* | 11/2020 | Magerkurth | H04L 63/0428 |
| 2014/0096188 | A1* | 4/2014 | Mont | G06Q 10/0637 726/1 |
| 2018/0117446 | A1* | 5/2018 | Tran | G06Q 20/389 |
| 2018/0189509 | A1* | 7/2018 | Goldsteen | G06F 21/604 |
| 2019/0109709 | A1* | 4/2019 | Wu | H04L 9/3236 |
| 2019/0116185 | A1* | 4/2019 | Nagai | G06F 16/1865 |
| 2019/0238525 | A1* | 8/2019 | Padmanabhan | G06F 21/6245 |
| 2019/0268284 | A1* | 8/2019 | Karame | H04L 9/3236 |
| 2019/0286828 | A1* | 9/2019 | Anderson | G06F 21/604 |
| 2019/0306173 | A1* | 10/2019 | Reddy | H04L 63/126 |
| 2019/0311153 | A1* | 10/2019 | Hollinger | G06F 21/6245 |

(Continued)

*Primary Examiner* — Ghodrat Jamshidi
(74) *Attorney, Agent, or Firm* — Jackson Walker L.L.P.

(57) ABSTRACT

An information handling system may include at least one processor and a non-transitory memory coupled to the at least one processor. The information handling system may be configured to: request logging information from a target information handling system, the target information handling system including private data therein; based on blockchain credentials stored in the information handling system, create a transaction record associated with the request, wherein a plurality of nodes associated with the blockchain are configured to process the transaction record to determine whether access should be granted to the logging information; and in response to the plurality of nodes determining that access should be granted, receive the logging information.

18 Claims, 4 Drawing Sheets

(56) References Cited

U.S. PATENT DOCUMENTS

| | | | |
|---|---|---|---|
| 2020/0092364 A1* | 3/2020 | Schultz | H04L 9/0637 |
| 2020/0119904 A1* | 4/2020 | Philyaw | H04L 9/0637 |
| 2020/0134066 A1* | 4/2020 | Yegorin | H04L 9/3239 |
| 2020/0162261 A1* | 5/2020 | Iyer | H04L 9/3236 |
| 2020/0169421 A1* | 5/2020 | Farkash | H04L 63/062 |

* cited by examiner

SELF-GOVERNED SECURE ATTESTATION POLICY FOR SERVER DATA PRIVACY LOGS

TECHNICAL FIELD

The present disclosure relates in general to information handling systems, and more particularly to systems and methods for management of private data in accordance with privacy regulations.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various information privacy regulations (typically jurisdiction-dependent) have been promulgated that define procedures for handling sensitive or personal data. Such data may be generally referred to herein as "private data," and may include items such as names, phone numbers, IP addresses, credit card numbers, social security numbers, location data, financial data, or any other data covered by a privacy regulation.

As one example of a privacy regulation, the General Data Protection Regulation (GDPR) in Europe applies to all European and foreign organizations handling the private data of European residents. Other examples of privacy regulations in different jurisdictions may include the California Consumer Privacy Act (CCPA), the Health Insurance Portability and Accountability Action (HIPAA), and any other rule, regulation, or law requiring specific protections related to the handling of personal or sensitive data. All of these are referred to generally as "privacy regulations" or "data privacy regulations" for purposes of this disclosure.

To satisfy GDPR requirements, for example, an enterprise should be able to track the movement (also referred to as the lineage) of a contact's private data. This may include tracking where it was first acquired, whether consent was obtained, where it moves over time, where it resides in each of the enterprise's systems, how it is used, whether it may be shared with third parties, whether portions must be redacted before sharing with third parties, etc.

Many existing systems for attempting compliance with privacy regulations tend to be unstructured and ad-hoc. For example, some of such systems may rely on manual tracking or email to attempt to track the lineage of private data.

Accordingly, it would be desirable to provide a more structured solution. According to some embodiments, the systems and methods described herein may provide such functionality, for example by providing a customizable attestation policy enforcement framework and tracking of private data movement. In some embodiments, this may be accomplished via the use of decentralized consensus and tamper-proof auditing principles, for example via a blockchain mechanism.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of private data may be reduced or eliminated.

In accordance with embodiments of the present disclosure, an information handling system may include at least one processor and a non-transitory memory coupled to the at least one processor. The information handling system may be configured to: request logging information from a target information handling system, the target information handling system including private data therein; based on blockchain credentials stored in the information handling system, create a transaction record associated with the request, wherein a plurality of nodes associated with the blockchain are configured to process the transaction record to determine whether access should be granted to the logging information; and in response to the plurality of nodes determining that access should be granted, receive the logging information.

In accordance with these and other embodiments of the present disclosure, a method may include a user requesting logging information from a target information handling system, the target information handling system including private data therein;

based on blockchain credentials for the user or for an information handling system of the user, creating a transaction record associated with the request, wherein a plurality of nodes associated with the blockchain are configured to process the transaction record to determine whether access should be granted to the logging information; and in response to the plurality of nodes determining that access should be granted, receiving the logging information.

In accordance with these and other embodiments of the present disclosure, an article of manufacture may include a non-transitory, computer-readable medium having instructions thereon that are executable by a processor of an information handling system for: requesting logging information from a target information handling system, the target information handling system including private data therein; based on blockchain credentials stored in the information handling system, creating a transaction record associated with the request, wherein a plurality of nodes associated with the blockchain are configured to process the transaction record to determine whether access should be granted to the logging information; and in response to the plurality of nodes determining that access should be granted, receiving the logging information.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
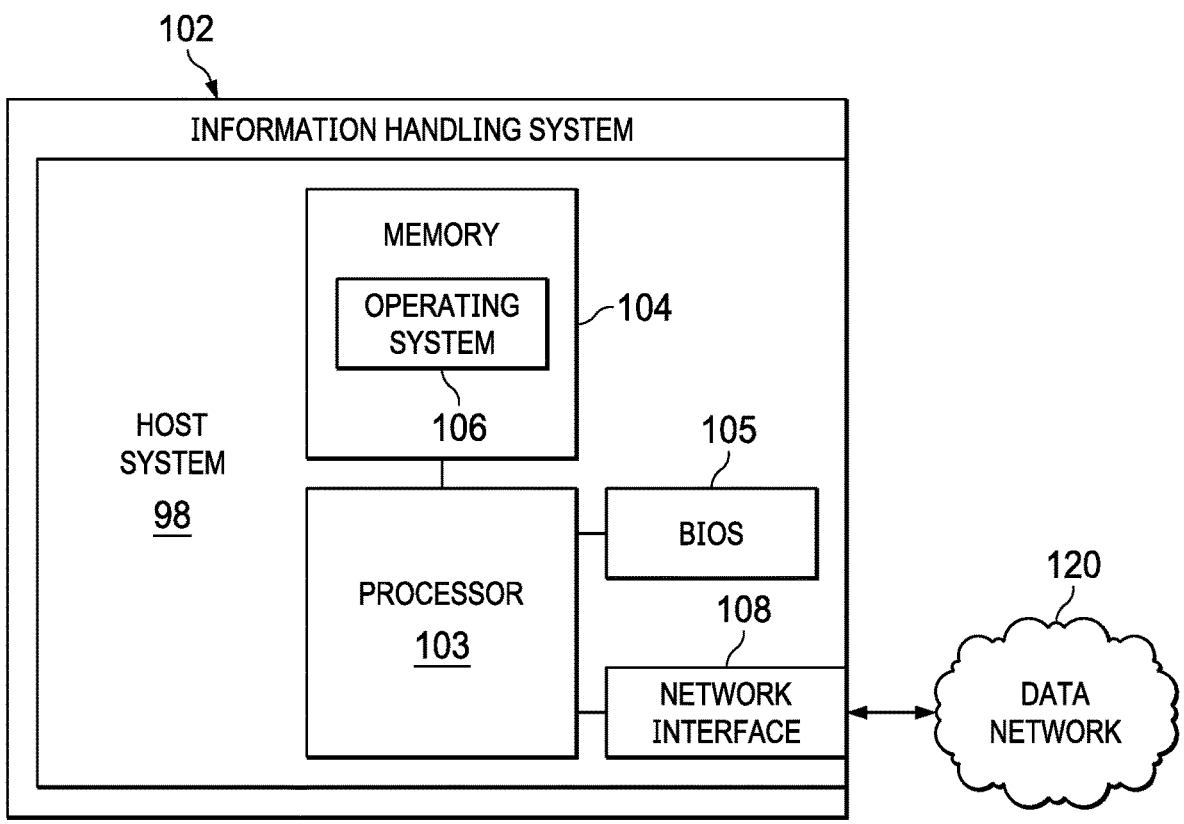
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

As discussed above, various privacy regulations may impact the ways in which an organization may deal with private data. As one example of an activity that may be impacted by such privacy regulations, server logs may be collected from servers that contain private data. For example, enterprise tools may need to collect system logs (e.g., for informational and debugging purposes) that may then be stored in a server or in remote logging servers. During system failures, server crash dumps and/or system logs may be shared with a product support team for further analysis.

Auditing and tracking the data source for such logs may be a challenge for the enterprise. Existing processes may have multiple complex mechanisms for auditing and manual/physical agreements for data sharing policies. Some data privacy regulations strictly mandate that personal data needs to masked before sharing to external parties. If the enterprise tools collect all the logs, then determining where the private data is stored across multiple application data sources (e.g., siloed applications) is a complex task. The unstructured approach (e.g., using email or various electronic forms) of tracking consent also becomes particularly challenging when policies are changed over time.

According to some embodiments of the present disclosure, a decentralized auditing and tracking system may be implemented at least in part via the use of a blockchain for authentication purposes.

The use of a blockchain in implementing portions of the present disclosure may provide various benefits. For example:

1. Authentication. The use of a secure private network (discussed in more detail below) on the blockchain ensures that no unauthorized nodes may participate.

2. Authorization. Every action (e.g., smart contract) within the network approved by the peers is subject to distributed consensus rules and regulations. This helps ensure that the transaction results of easily trusted and verifiable.

3. Accounting. The immutable transaction ledger helps in infrastructure lifecycle history, which is tamper-proof for ease of conducting further analytics.

Some embodiments of this disclosure may use Ethereum as a blockchain. More details regarding Ethereum are provided in an Appendix to the specification, but a brief introduction is as follows.

Ethereum is a programmable blockchain. Rather than giving users only a set of pre-defined operation (e.g, as does Bitcoin in the case of cryptocurrency), it may serve as a platform for many different types of decentralized blockchain applications. Ethereum's basic unit is the account. The Ethereum blockchain tracks the state of every account, and all state transitions on the Ethereum blockchain are transfers of value and information between accounts.

There are two types of accounts in the Ethereum blockchain: externally owned accounts (EOAs), which are controlled by private keys; and contract accounts, which are controlled by their contract code and can only be activated by an EOA.

Ethereum may be used for executing so-called "smart contracts." This term refers to a program that is executed on a blockchain by a plurality of blockchain nodes, wherein its state is secured by the blockchain. A smart contract can be used to encode business logic and carry out transactions to implement decentralized applications.

When a contract is executed as a result of being triggered by a message or transaction, every instruction is executed on every node of the Ethereum network. This has a cost: for every executed operation there is a specified cost, expressed in a number of gas units. Gas is the name for the execution fee that senders of transactions pay for every operation made on an Ethereum blockchain.

The Ethereum protocol charges a fee per computational step that is executed in a contract or transaction to prevent deliberate attacks. Every transaction includes a gas limit and a fee that it is willing to pay per transaction and collecting the fee or not. If the total amount of gas used by the computational steps spawned by the transaction (e.g., including the original message and any sub-messages that may be triggered) is less than or equal to the gas limit, then the transaction is processed. If the total gas exceeds the gas limit, then all changes are reverted, except that the transaction is still valid and the fee can still be collected by the miner. All excess gas not used by the transaction execution is reimbursed to the sender as Ether.

Different types of permission networks may be used within the Ethereum blockchain: public, consortium, and private. A public blockchain is a blockchain that anyone in the world can read, anyone in the world can send transactions to and expect to see them included if they are valid, and in which anyone in the world can participate in the consensus process. Public blockchains are generally considered to be "fully decentralized."

A consortium blockchain is a blockchain where the consensus process is controlled by a pre-selected set of nodes. For example, one might imagine a consortium of 15 financial institutions, each of which operates a node and of which 10 must sign every block in order for the block to be valid. These blockchains may be considered "partially decentralized."

A fully private blockchain is a blockchain where write permissions are kept centralized to one organization. Read permissions may be public or may be restricted to an arbitrary extent. Typical applications include database management, auditing, etc. that are internal to a single company, and so public readability may not be necessary in many cases, although in other cases public auditability is desired. In some embodiments of the present disclosure, a fully private Ethereum blockchain may be utilized.

FIG. 1 illustrates a block diagram of an example information handling system 102, which may be used to implement part or all of some embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over data network 120). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may be used to implement portions of the present disclosure, in some embodiments. For example, information handling system 102 may be configured to access an Ethereum blockchain via data network 120, as well as carrying out other data privacy management techniques in accordance with this disclosure.

Figure 2:
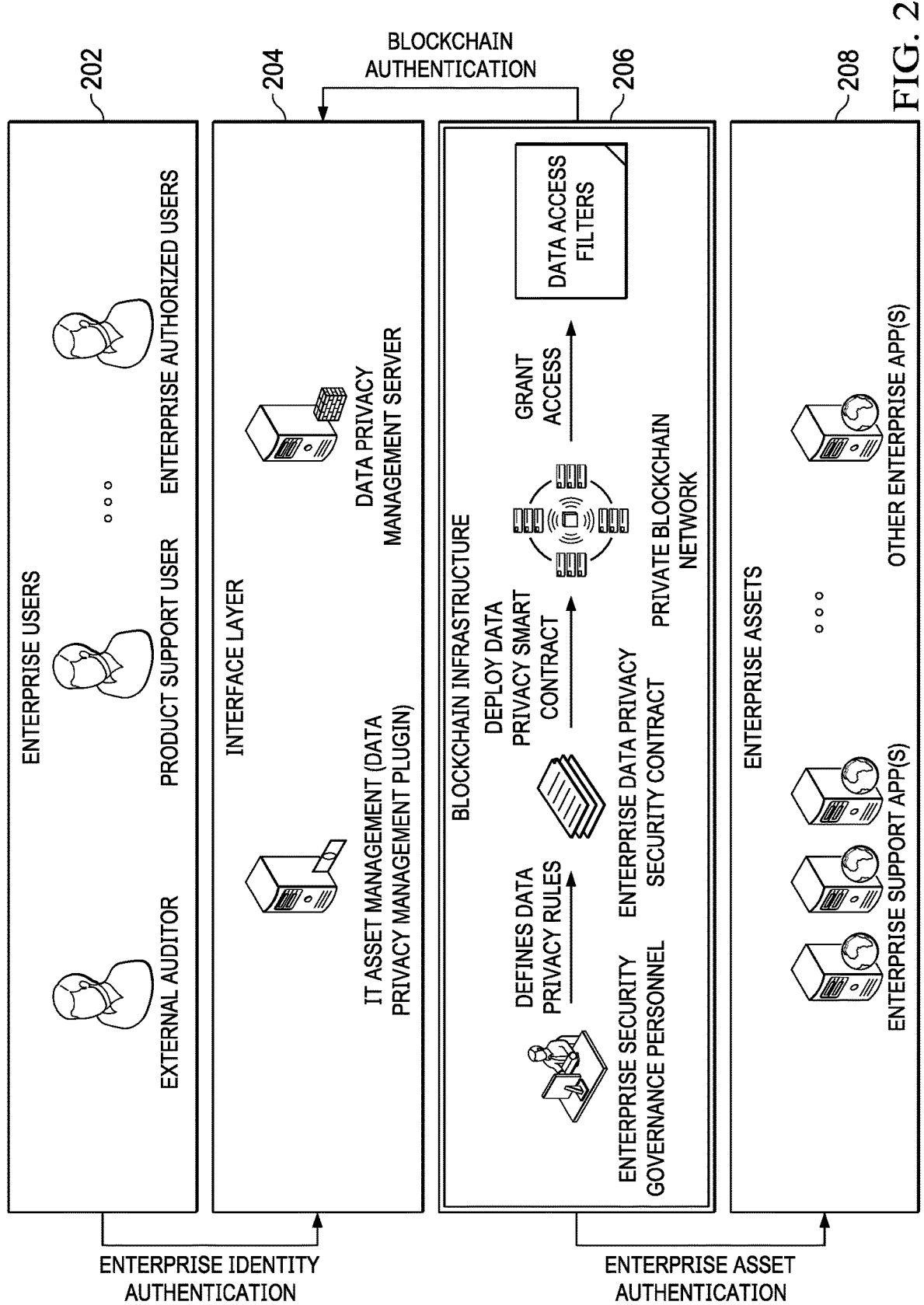
FIG. 2 illustrates a flow chart of an example method, in accordance with embodiments of the present disclosure.

Turning now to FIG. 2, a high-level flowchart of a method for obtaining access to system logs is shown, in accordance with some embodiments of this disclosure. As discussed above, system logs may include private data subject to one or more privacy regulations.

Enterprise users 202 may include external auditors, product support users, enterprise authorized users, or any other users requiring access to logging information for information handling systems that may include private data.

Enterprise users 202 may be authenticated via an enterprise identity authentication system at interface layer 204.

In accordance with various embodiments, interface layer 204 may be implemented as a data privacy management server and/or as a plugin to existing IT asset management solutions.

As shown in FIG. 2, blockchain infrastructure 206 may include various functionality for authentication of users and/or enterprise assets 208.

Figure 3:
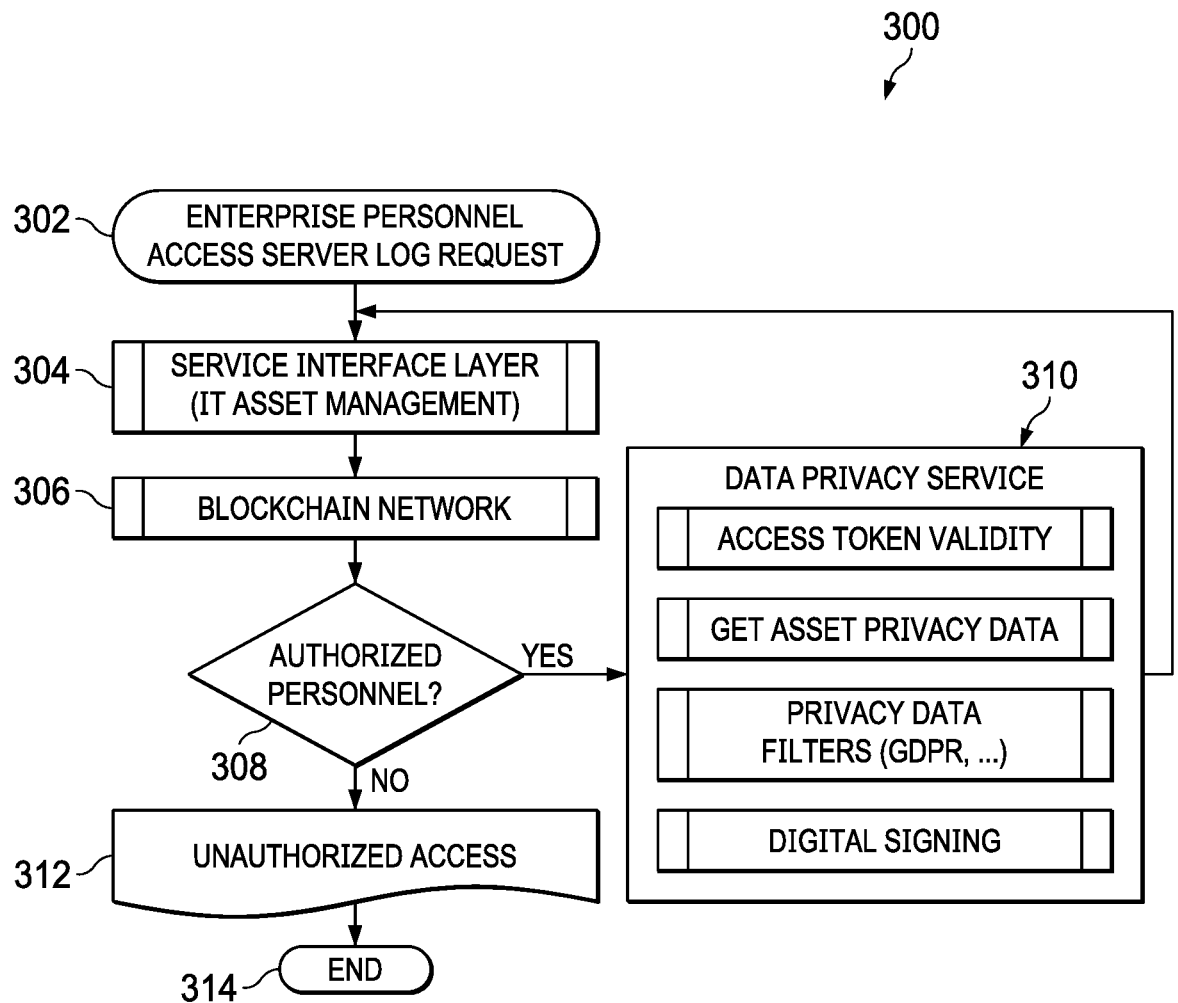
FIG. 3 illustrates a flow chart of an example method, in accordance with embodiments of the present disclosure.

FIG. 3 illustrates a flow chart of an example method 300 for private data management, in accordance with embodiments of the present disclosure. According to certain embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen. In these and other embodiments, method 300 may be implemented as hardware, firmware, software, applications, functions, libraries, or other instructions.

Method 300 illustrates a tamper-proof secure attestation service for secure data transit between enterprise tool set(s) and users of private data. At step 302, enterprise personnel access a server log request function. Enterprise personnel may requests asset logs by providing valid digital signed consent details for debugging purposes or any other purposes.

At step 304, the enterprise personnel may use an IT asset management tool or service management interface that is capable of providing data privacy protection policies.

At step 306, the enterprise personnel must have valid blockchain user credentials (e.g., public/private keys) to access the enterprise asset data. The successfully authenticated personnel may be able to create a transaction record for obtaining access to the private data. The transaction record may contain a consent form, context information, reason-for-access information, purpose-of-access information, and target asset information for accessing the privacy logs. The transaction record may be implemented as a smart contract for execution on the Ethereum blockchain. Details of the implementation of such a smart contract may be dependent upon the specific privacy regulation in effect (e.g., GDPR, etc.).

At step 308, the transaction record may be processed by the blockchain peer nodes, performing a series of security checks, which may include the following:

1. Consent digital signature: consent digital signature must be valid with enterprise security policies. This allows users to provide evidence of who they are, the purpose of data access, etc.

2. Enterprise asset authorization policy: determine whether the user has necessary permission to access the enterprise assets.

3. Context verification: determine whether the purpose and reason for data access matches the enterprise security criterion.

At step 310, the successful execution the smart contract may cause an access token to be granted for accessing the asset logs. The data privacy service may apply appropriate filters to mask the data on the asset log data, etc. In some embodiments, a "time bound" token may be granted that prevents access after a certain time period.

At step 312, alternatively, the access token is denied if access is unauthorized.

It should be noted that in some embodiments, each step of method 300 may be timestamped and digitally signed by each service layer for audit trails.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using any of the various components disclosed herein (such as the components of FIG. 1), and/or any other system operable to implement method 300. In certain embodiments, method 300 may be implemented partially or fully in software and/or firmware embodied in computer-readable media.

Figure 4:
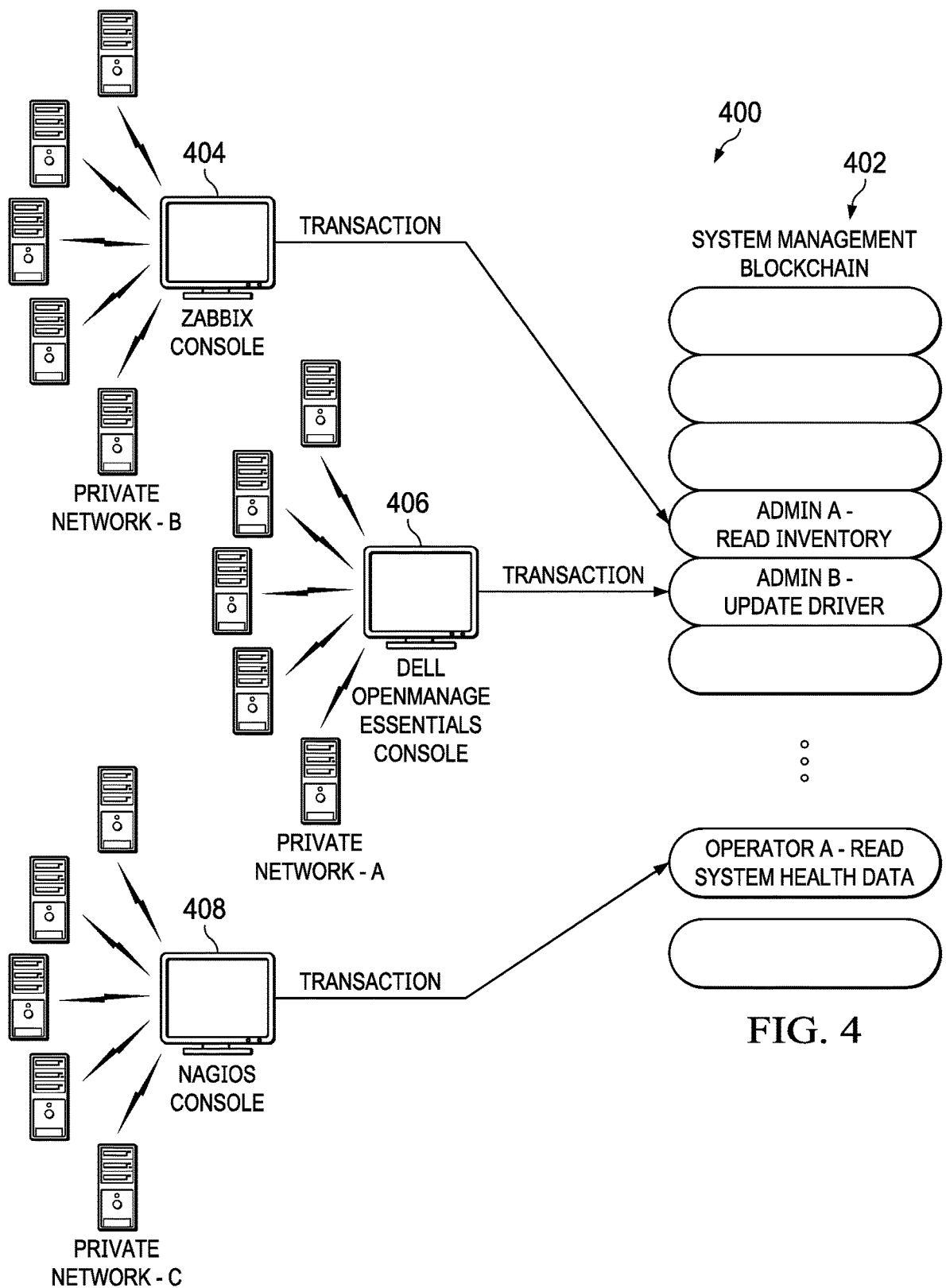
FIG. 4 illustrates an example system and various transactions, in accordance with embodiments of the present disclosure.

Turning now to FIG. 4, an example system 400 is shown in which techniques according to the present disclosure may be utilized. As shown, SystemsManagement blockchain 402 may maintain a transaction history regarding access to private data.

The first entry explicitly shown in SystemsManagement blockchain 402 is that a monitoring console such as a Zabbix console 404 may be operated by Administrator A to read an inventory of a system.

The next entry is that Administrator B may use a different management console such as a Dell OpenManage Essentials console 406 to update a driver on the system.

Finally, Operator A may use yet another console such as a Nagios console 408 to request to read system health data.

Any or all of these transactions may be subject to authentication and verification according to the techniques described herein.

Various particular embodiments have been described in detail above. Some of such embodiments may include additional features as well.

For example, this disclosure may enable an enterprise to define jurisdiction-specific data privacy protection business rules for any relevant privacy regulation. Pre-enabled data privacy filters (e.g., containing data protection policies and specific actions such as masking of private data, erasure of private data, etc.) may enable easy enterprise adoption and easy modifications as specifications evolve.

Pre-defined smart contracts in the blockchain infrastructure may provide a mechanism of tamper-proof transit data movement records and data attestation services for secure auditing purposes.

The techniques disclosed herein provide for a customized attestation policy enforcement framework which tracks movement of private data from various data sources (e.g., application tools) using the distributed ledger blockchain technology.

In some embodiments, portions of this disclosure may be implemented as a data privacy management server or application, which is a primary interface layer for enterprise administrators and external parties. Such application may be easily integrated with existing IT asset management tools or any enterprise management tools. This application provides a data privacy service which implements the jurisdiction-specific rules definitions, as well as corresponding enforcement. One advantage of this service provides a unique platform for enterprises to define region/country specific data privacy policies. Further, enforcement rules such as masking, deletion, or any kind of filtering may be applied on the data based on the privacy requirements. This platform provides the capability of extending or modifying the policies when there is a change or new specifications. This service may act as a blockchain node and further define the authentication and authorization policies for data privacy as smart contracts.

The security policy for accessing server logs may be defined through blockchain smart contracts. Accessing the smart contracts may require valid authentication and authorization roles. Both enterprise users and external parties may be required to have a valid blockchain account. The smart contract defines various rules to check whether the data accessor has a valid user account, permissions, and valid context and purpose of data collection. Then the valid authenticated and authorized users are given permission to access the logs by applying the appropriate data filters. Unauthorized users are denied accessing the enterprise logs.

The distributed ledger may contain audit logs in secure records with digital attestation of both users (data accessor and data provider) digital IDs, filtered data (metadata hash), and consent form (which may include the purpose of data usage, context and other details for the tracking consistently and efficiently).

The techniques herein may enhance the enterprise's compliance with privacy regulations by providing tamper-proof auditing and trustable data transit between personnel.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to:
   request logging information from a target information handling system, the target information handling system including private data therein;
   based on blockchain credentials stored in the information handling system, create a transaction record associated with the request, wherein a plurality of nodes associated with the blockchain are configured to process the transaction record to determine whether access should be granted to the logging information, and wherein the transaction record includes consent information, context information, reason-for-access information, and target asset information; and
   in response to the plurality of nodes determining that access should be granted, receive the logging information, wherein the determination that access should be granted is based at least in part on a smart contract rule regarding the reason-for-access information.

2. The information handling system of claim 1, wherein the blockchain credentials include a private key and a corresponding public key.

3. The information handling system of claim 1, wherein the blockchain is an Ethereum blockchain.

4. The information handling system of claim 3, wherein the transaction record is a smart contract.

5. The information handling system of claim 1, wherein the plurality of nodes associated with the blockchain are configured to verify a digital signature associated with the consent information.

6. The information handling system of claim 1, wherein the plurality of nodes associated with the blockchain are configured to verify if the information handling system is authorized to access the logging information based on the target asset information.

7. The information handling system of claim 1, wherein the plurality of nodes associated with the blockchain are configured to determine whether or not the reason-for-access information and the purpose-of-access information are in accordance with an enterprise security policy.

8. The information handling system of claim 1, wherein at least a portion of the private data is masked in the received logging information.

9. A method comprising:
   a user requesting logging information from a target information handling system, the target information handling system including private data therein;
   based on blockchain credentials for the user or for an information handling system of the user, creating a transaction record associated with the request, wherein a plurality of nodes associated with the blockchain are configured to process the transaction record to determine whether access should be granted to the logging information, and wherein the transaction record includes consent information, context information, reason-for-access information, and target asset information; and in response to the plurality of nodes determining that access should be granted, receiving the logging information, wherein the determination that access should be granted is based at least in part on a smart contract rule regarding the reason-for-access information.

10. The method of claim 9, wherein the transaction record includes information specific to a privacy regulation that is applicable to the private data.

11. An article of manufacture comprising a non-transitory, computer-readable medium having computer-executable code thereon that is executable by a processor of an information handling system for:

requesting logging information from a target information handling system, the target information handling system including private data therein;

based on blockchain credentials stored in the information handling system, creating a transaction record associated with the request, wherein a plurality of nodes associated with the blockchain are configured to process the transaction record to determine whether access should be granted to the logging information, and wherein the transaction record includes consent information, context information, reason-for-access information, and target asset information; and in response to the plurality of nodes determining that access should be granted, receiving the logging information, wherein the determination that access should be granted is based at least in part on a smart contract rule regarding the reason-for-access information.

12. The article of claim 11, wherein the blockchain credentials include a private key and a corresponding public key.

13. The article of claim 11, wherein the blockchain is an Ethereum blockchain.

14. The article of claim 13, wherein the transaction record is a smart contract.

15. The article of claim 11, wherein the plurality of nodes associated with the blockchain are configured to verify a digital signature associated with the consent information.

16. The article of claim 11, wherein the plurality of nodes associated with the blockchain are configured to verify if the information handling system is authorized to access the logging information based on the target asset information.

17. The article of claim 11, wherein the plurality of nodes associated with the blockchain are configured to determine whether or not the reason-for-access information and the purpose-of-access information are in accordance with an enterprise security policy.

18. The article of claim 11, wherein at least a portion of the private data is masked in the received logging information.

* * * * *